No. 844,970. PATENTED FEB. 19, 1907.
A. E. SPRATLEY.
RAIL JOINT.
APPLICATION FILED NOV. 14, 1906.
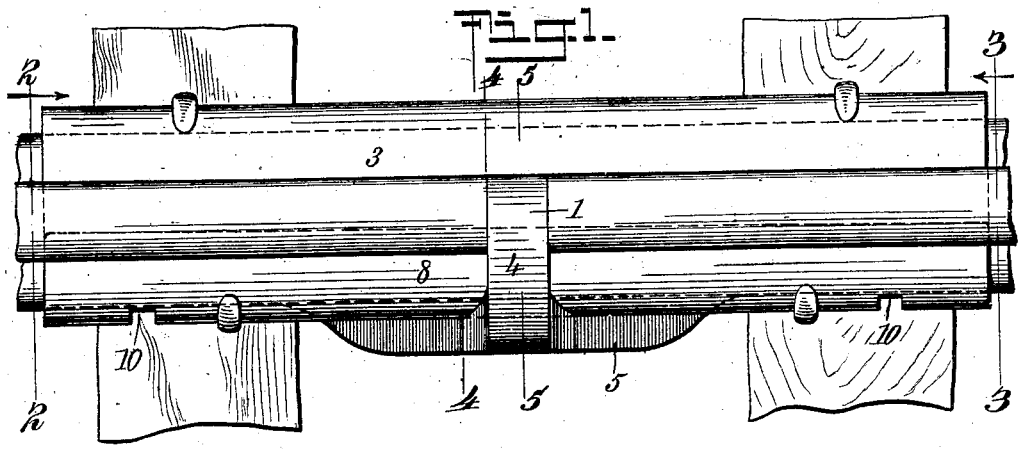
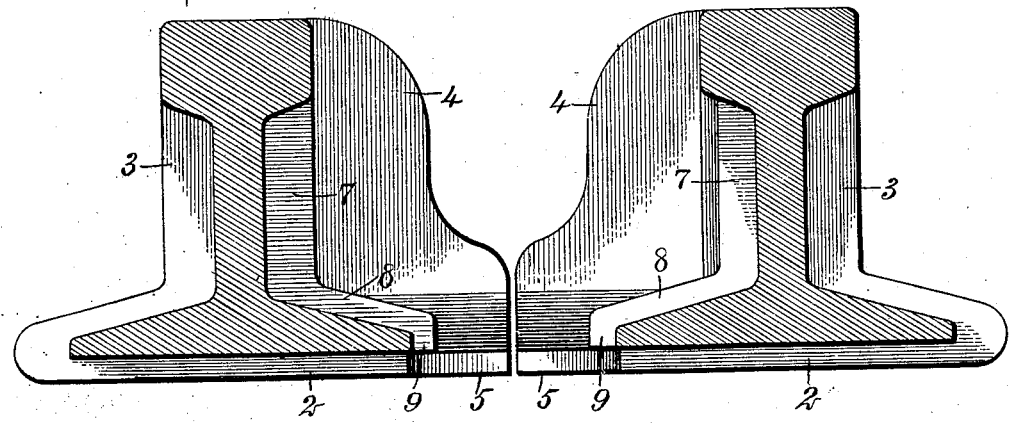
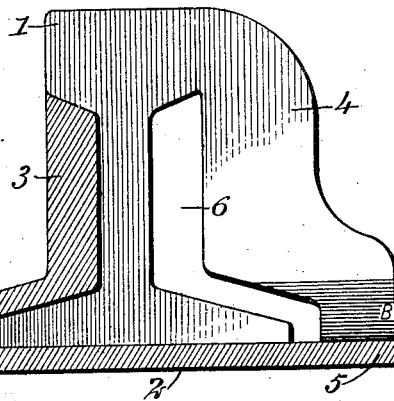
WITNESSES
INVENTOR
Alfred E. Spratley
BY Munn & Co
ATTORNEYS

UNITED STATES PATENT OFFICE.

ALFRED EDWARD SPRATLEY, OF MONETT, MISSOURI.

RAIL-JOINT.

No. 844,970.  Specification of Letters Patent.  Patented Feb. 19, 1907.

Application filed November 14, 1906. Serial No. 343,325.

*To all whom it may concern:*

Be it known that I, ALFRED EDWARD SPRATLEY, a citizen of the United States, and a resident of Monett, in the county of Barry and State of Missouri, have invented a new and Improved Rail-Joint, of which the following is a full, clear, and exact description.

This invention is an improvement in rail-joints, having among other objects to dispense with the use of bolts and other devices for positively connecting the rail ends together, and thereby admitting of the rails expanding independently of each other.

The construction is such that the strength of the joint is materially increased and the ends of the rails supported in a way to prevent the constant pounding of the train-wheels depressing them at this point.

The preferred form of construction comprises a rail-section adapted to be inserted between the meeting ends of two rails. This section is formed integral with a combined base-plate and fish-plate enveloping and embracing the rail ends at one side. An offset member integral with the rail-section at the opposite side thereof and also integral with the base-plate is shaped to conform to the web and flange of the section, leaving a space therebetween in which a wedge-plate having a flange with a downwardly-turned edge is driven.

Reference is to be had to the accompanying drawings, forming a part of this specification, in which similar characters of reference indicate corresponding parts in all the figures.

Figure 1 is a plan of my improved joint. Fig. 2 is a cross-section on the line 2 2 of Fig. 1 looking in the direction of the arrow. Fig. 3 is a corresponding section on the line 3 3 of Fig. 1 looking in the opposite direction. Fig. 4 is a cross-section on the line 4 4 of Fig. 1; and Fig. 5 is a section on the line 5 5 of Fig. 1, disclosing the integral formation of the rail-section, combined base and fish plate, and the offset member at the opposite side of the section.

The rail-joint embodies in its construction a rail-section 1, which is placed between the meeting ends of two rails and is formed integral with a combined base-plate and fish-plate 2 and 3, respectively, which envelop and embrace the rail ends at the bottom and at one side and afford means to support said rail ends and prevent them from being depressed, as by the constant pounding of the train-wheels at this point. At the opposite side of the rail-section 1 is formed integral with the head thereof an offset member 4, which is also integral with the base-plate 2, an extension 5 at one side of the base-plate being provided for joining these two parts. The shape of the member 4, as shown in Fig. 4, is such as to provide a space 6 between it and the rail-section exactly conforming to the web and flange of the latter. In this space is driven a wedge-plate 7, having a flange 8 projecting therefrom to engage the flanges of the section and rail ends and a downwardly-turned edge 9 for engaging the edges of said flanges. The combined base-plate and fish-plate is provided with notches for receiving spikes or like devices securing it to the sleepers, and like notches 10 are formed in the flange 8 and downwardly-turned edge 9 of the wedge-plate 7 for likewise securing this part of the construction in place.

Having thus described my invention, I claim as new and desire to secure by Letters Patent—

1. A rail-joint comprising a rail-section arranged between the meeting ends of two rails, a combined base-plate and fish-plate formed integral with each other and with said section for enveloping and inclosing the bottom and one side of the meeting ends of said rails, an offset member formed integral with said section, base-plate and fish-plate, and a wedge-plate having a flange with a downwardly-turned edge driven between said sections and said member.

2. A rail-joint comprising a rail-section arranged between the meeting ends of two rails, a combined base-plate and fish-plate formed integral with each other and with said section for enveloping and engaging the bottom and one side of the meeting ends of said rails, an offset member formed integral with said section, base-plate and fish-plate, and a wedge-plate having a flange with a downwardly-turned edge driven between said section and said member, said flange and downwardly-turned edge of the wedge-plate having notches therein adapting them to be spiked to the sleepers.

In testimony whereof I have signed my name to this specification in the presence of two subscribing witnesses.

ALFRED EDWARD SPRATLEY.

Witnesses:
JAMES E. SATER,
D. L. MAYHEW.